United States Patent [19]

Grane et al.

[11] 3,927,120

[45] Dec. 16, 1975

[54] PREPARATION OF PHENYL METHYL CARBINOL

[75] Inventors: Henry R. Grane; Thomas S. Zak, both of Springfield, Pa.

[73] Assignee: Atlantic Richfield Company, Los Angeles, Calif.

[22] Filed: Sept. 3, 1974

[21] Appl. No.: 502,583

[52] U.S. Cl. ............. 260/618 H; 252/475; 252/476
[51] Int. Cl.² ........................................ C07C 29/00
[58] Field of Search ................................ 260/618 H

[56] References Cited
UNITED STATES PATENTS

| | | | |
|---|---|---|---|
| 2,234,100 | 4/1904 | Ipatieff et al. .................. | 260/618 H |
| 2,400,959 | 5/1946 | Stewart ........................... | 260/618 H |
| 3,565,921 | 2/1971 | Gobron et al. .................. | 260/618 H |

OTHER PUBLICATIONS

Williams, *J. Organic Chem.*, Vol. 19, pp. 1205–1214 (1954).

*Primary Examiner*—James O. Thomas, Jr.
*Assistant Examiner*—James H. Reamer
*Attorney, Agent, or Firm*—John R. Ewbank

[57] ABSTRACT

Phenyl methyl carbinol is prepared from acetophenone by hydrogenation over a fixed bed of copper containing catalyst in the presence of a molar excess of hydrogen at 0.2–10 WHSV at 90°–150°C., improved conversion, selectivity and/or yield being achieved by reason of the acetophenone being dissolved in 20–80 percent mononuclear aromatic hydrocarbon of the group consisting of benzene, ethyl benzene, and toluene.

3 Claims, No Drawings

PREPARATION OF PHENYL METHYL CARBINOL

RELATED APPLICATIONS

Reference is made to our application Ser. No. 494,573 filed Aug. 5, 1974, also concerned with the preparation of methyl phenyl carbinol.

FIELD OF INVENTION

This invention relates to aromatic alcohols prepared by catalytic hydrogenation of aromatic ketones and is particularly concerned with the catalytic hydrogenation of acetophenone to phenyl methyl carbinol.

PRIOR ART

Ipatieff et al. 2,234,100 describes the preparation of phenyl methyl carbinol by hydrogenation of acetophenone. The hydrogenative reduction of precursor pellets comprising an aluminum oxide matrix, zinc oxide, and cupric oxide is conducted at 510°C. to achieve substantially complete reduction of both the zinc and copper to the metallic state. The amount of zinc, copper and aluminaceous components initially employed might provide (no loss basis) a catalyst containing approximately 12 percent copper, 25 percent zinc, and 63 percent alumina. The patent defines the Ipatieff et al. catalyst as "a composite material comprising essentially copper, zinc, and alumina".

The Ipatieff et al. pellets were employed in a batch reactor maintained for 3 hours at 107°C. under an initial hydrogen pressure of 100 atmospheres to achieve a 93 percent yield of phenyl methyl carbinol.

An article by J. L. R. Williams in *Journal of Organic Chemistry*, Volume 19, pages 1205–14 (1954) discusses the preparation of phenyl methyl carbinol from acetophenone and the minimizing of formation of dimer products, ethyl benzene, and/or other hydrogenolysis products attributable to using temperature, hydrogen pressure, and/or catalyst for greater severity than needed for the carbinol synthesis.

Stewart U.S. Pat. No. 2,400,959 describes the batchwise preparation of phenyl methyl carbinol by hydrogenation of acetophenone at 580 psig at 118°C. using a catalyst comprising calcium oxide, copper oxide, and vanadium oxide.

To the extent that acetophenone and/or phenyl methyl carbinol are prepared as by-products, there is a propensity to convert them to compounds such as styrene or ethyl benzene, for which general markets exist, inasmuch as business losses can result from attempts to distribute such oxyderivatives without appropriate specialized marketing know-how. Suspended catalyst systems have been used on an industrial basis in the hydrogenation of acetophenone to phenyl methyl carbinol. Notwithstanding the general attractiveness of fixed bed systems, and notwithstanding the hundreds of literature descriptions of the hydrogenation of acetophenone, and notwithstanding the long-standing demand for an industrial method for hydrogenating acetophenone to phenyl methyl carbinol over a fixed bed of catalyst, there has been a failure to develop a commercially attractive method of hydrogenating acetophenone to phenyl methyl carbinol over a fixed bed of hydrogenation catalyst.

SUMMARY OF THE INVENTION

In accordance with the present invention, acetophenone is hydrogenated to phenyl methyl carbinol over a fixed bed of catalyst particles consisting essentially of copper in a zinc oxide matrix, there being an improvement in the conversion, selectivity and/or yield by reason of the utilization of mononuclear aromatic hydrocarbon of the group consisting of benzene, ethyl benzene, and toluene as a solvent constituting between about 20 percent to 80 percent by weight of the reactant stream. The hydrogenation may be conducted at 90°–150°C. at a space velocity of about 0.2–10 WHSV at an elevated pressure using a molar excess of hydrogen. In certain preferred embodiments, the catalyst particles are reduced at a temperature below 300°C. The ratio of zinc atoms to copper atoms is desirably regulated to be within the range from about 2:1 to about 8:1, that is, to have a unit ratio from 2 to 8.

The invention is further clarified by reference to a plurality of examples:

EXAMPLE I

An aqueous solution is prepared by employing two liters of hot water, 440 grams (2 moles) of zinc acetate dihydrate and 200 grams (1 mole) of cupric acetate hydrate. The solution is transferred to a pressurized reactor and treated with carbon dioxide under pressure to provide a suspension of mixed carbonates, which suspension is pumped to a spray dryer maintained at a temperature of about 300°C. Acetic acid, water, and excess carbon dioxide are removed in the spray drying zone. Moreover, the carbonates are decomposed to carbon dioxide and metal oxides. The product from the spray drying zone is a powder consisting essentially of a mixture of zinc oxide and copper oxide in a 2:1 mole ratio. Such powder is tableted to provide a porous granular catalyst particle suitable for use in a fixed bed of catalyst and consisting essentially of the mixed oxides of zinc and copper in a 2:1 mole ratio. A bed of the thus prepared tablets is subjected to a stream consisting of 98 percent nitrogen and 2 percent hydrogen and the catalyst bed is heated from room temperature gradually to a temperature of 275°C., whereby substantially all of the copper oxide is reduced to metallic copper distributed throughout the matrix of zinc oxide. The catalyst consists of approximately 28 percent copper and about 72 percent zinc oxide. The porosity of the catalyst particles is such that liquid acetophenone and/or liquid phenyl methyl carbinol readily permeates through the micro pores of the catalyst tablets. The catalyst can be handled with the precautions generally applicable to fixed beds of hydrogenation catalysts. After cooling in nitrogen to room temperature, the catalyst can be treated with a nitrogen stream containing a small amount of oxygen to oxidize the catalyst prior to re-exposure to ambient air. The catalyst has attractive stability for repeated cycles of oxidation and reduction.

A catalyst bed consisting of reduced tablets as previously described is heated in a hydrogen stream in a pressurized reactor. The catalyst bed is maintained at 116°C. and 1200 psig. In a control test in the absence of solvents, acetophenone is directed, together with three moles of hydrogen per mole of acetophenone over the catalyst bed at a space rate of about 1 weight of acetophenone per weight of catalyst per hour. At the control test conditions, the acetophenone is converted to the extent of 85 percent so that the product contains only 15 percent of the acetophenone starting material. The selectivity of the reaction is about 95 percent so that 95 percent of the acetophenone which reacts is hydrogenated to phenyl methyl carbinol, with only 5 percent by-products. Thus, the yield of phenyl methyl carbinol is about 80.8 percent of the acetophenone.

In a process featuring the present invention, the acetophenone is diluted with ½ its weight in benzene so that a solution is prepared consisting of 33 percent benzene and 67 percent acetophnone. The liquid stream flows at a more rapid rate so that the space rate is about 1 weight of acetophenone per weight of catalyst per hour. Accordingly, the only significant variable from the control is the presence of 33 percent benzene in the reactant stream. Surprisingly, such presence of the solvent increases the conversion to about 94 percent. Moreover, the selectivity of the reaction is increased to about 98 percent so that only about 2 percent by-products are formed. The yield of phenyl methyl carbinol (selectivity times conversion) is about 94 percent. Because the yield in the control is only about 80.8 percent, the difference in yield of 13.2 percent represents a 16.3 percent improvement over the control. It is surprising that the use of the benzene solvent should provide such a 16.3 percent improvement in yield of phenyl methyl carbinol, the desired product. The empirical superiority of the process is emphasized without assertion of a particular theoretical explanation for such superiority. One plausible retrospective justification stresses a propensity of oxygen compounds to cling to copper sites and the ability of the hydrocarbon to sweep such oxygen compounds from the catalyst sites.

EXAMPLE II

Acetophenone is hydrogenated to phenyl methyl carbinol at control and invention conditions essentially the same as described in Example I, but substituting a commercially available catalyst tablet marketed by Catalysts & Chemicals, Inc. as C-61-1 catalyst tablets and containing less than 2 percent aluminum oxide and consisting essentially of oxides of zinc oxide and copper oxide in a 2:1 mole ratio. The results obtained using C-61-1 are duplicative of Example I, thus indicating that for purposes of the present invention, catalyst tablets derived from mixed carbonates, as described in connection with claim 1, are equivalent to C-61-1 catalyst tablets.

EXAMPLE III

Following the general procedure of Example II, phenyl methyl carbinol was prepared in accordance with the present invention employing a reaction solution consisting of 60 percent ethyl benzene and 40 percent by weight of acetophenone. The space rate control was based upon the total feedstock. In the control, the feed was undiluted acetophenone. The reactor was maintained at 1200 psig and the hydrogen to acetophenone molar ratio was approximately 3:1 using the CCI C-61-1 catalyst tablet. At control conditions in the absence of solvent, the hydrogenation data are as follows:

| Run | WHSV | Temperature °F. | °C. | Conversion | Selectivity |
|---|---|---|---|---|---|
| A | 1 | 240 | 116 | 85 | 95 |
| B | 1 | 245 | 119 | 90 | 92 |
| C | 1 | 275 | 135 | 94 | 88 |
| D | 2 | 275 | 135 | 78 | 88 |

Superior results were conspicuous in using ethyl benzene diluent at approximately comparable conditions to obtain the following hydrogenation data:

| Run | WHSV | Temperature °F. | °C. | Conversion | Selectivity |
|---|---|---|---|---|---|
| E | 1 | 210 | 99 | 99+ | 99+ |
| F | 1 | 230 | 110 | 99+ | 81 |
| G | 2 | 245 | 119 | 99+ | 87 |
| H | 2 | 200 | 93 | 95 | 98 |

Moreover, prolonged tests established that the catalyst has commercially acceptable stability at conditions achieving 95+ percent conversion and 95+ percent selectivity.

EXAMPLE IV

A series of runs was made using as the reaction mixture a composition consisting essentially of 40 percent acetophenone and 60 percent methyl phenyl carbinol. In the hydrogenation test, the use of the product of phenyl methyl carbinol as the solvent proved disadvantageous. Under such conditions, the sensitivity of the reaction to temperature was significant, so that decreased selectivity could occur with relatively small increments of temperature. By a series of tests it is established that oxygen containing solvents are unsuited as the yield-enhancing solvent for the reaction mixture in the present invention.

A reaction mixture consisting of equal parts by weight of toluene and acetophenone is hydrogenated at the conditions of Example III. Toluene is shown to be substantially as satisfactory as ethyl benzene as a solvent for this reaction, thereby establishing the advantages of employing toluene as a solvent for enhancing the yield of the phenyl methyl carbinol product.

By a series of tests it is established that the solvent for the hydrogenation of acetophenone must be selected from the group of mononuclear aromatic hydrocarbons consisting of benzene, ethyl benzene, and toluene.

EXAMPLE V

By a series of tests it is established that the reaction must be conducted within a temperature range from about 90°C. to about 150°C. at a space velocity of from about 0.2 to about 10 weight of a plant grade of acetophenone per weight of catalyst per hour. The plant grade of acetophenone is called feedstock to distinguish it from the yield-enhancing solvent, which is ordinarily recycled. The reactant stream must contain hydrogen in a molar excess of the molar concentration of acetophenone, and desirably the $H_2/C_6H_5COCH_3$ unit molar ratio is within a range from 2 to 8. Unused hydrogen is generally recycled. The reaction should be conducted as a stream of reactant flows through a solid bed of particles consisting essentially of copper in a zinc oxide matrix as hydrogenation catalyst. The solvent selected from the group of mononuclear aromatic hydrocarbon solvents of the group consisting of benzene, ethyl benzene, and toluene, should be present in a concentration within the range of from about 20 percent to about 80 percent of the liquid portion of the reaction mixture, all of the balance, that is, from about 80 percent to about 20 percent, should be a stream containing acetophenone as the principal component and accordingly designated as a plant grade of acetophenone.

Even though the solvent necessitates a more rapid rate of flow of reaction mixture through the catalyst zone for maintaining an identical space velocity of acetophenone, the conversion, selectivity, and/or yield of phenyl methyl carbinol is superior to that obtained in the absence of said mononuclear aromatic hydrocarbon solvent. Advantages flow from using said solvent in a concentration within the range from 51 percent to 80 percent of the liquid stream fed to the reactor inlet. The catalyst must consist essentially of copper distributed in a zinc oxide matrix. Desirably, the ratio of zinc atoms to copper atoms is within the range from 2:1 to 8:1. If the zinc to copper atom ratio is excessively high, so that the copper content of the catalyst is below about 9 percent, then cost problems are encountered, even at the lower end of the space rate range, in attaining a commercially attractive operation at a price having competitive advantages. If the copper content is excessively high, such as above about 33 percent, then the selectivity of the catalyst for formation of phenyl methyl carbinol is impaired. The stability of the catalyst and ability to withstand prolonged operation without sintering or loss of surface area are also jeopardized if the zinc oxide matrix is less than about 67 percent of the catalyst.

Reduction conditions for the copper containing catalyst should be mild so that the metal oxide matrix is not reduced to metal. British Pat. No. 1,082,298 describes reduction conditions appropriate for a catalyst of the type of the C-61-1 copper in zinc oxide catalyst. A brass catalyst, consisting of an alloy of metallic zinc and copper, is inoperative. The temperature for the reduction of the copper oxide must be below 200°C. and is desirably below the 150°C maximum for the hydrogenation reaction, thus avoiding reduction of the zinc oxide to metallic zinc.

We claim:

1. In a method in which a liquid stream of acetophenone and a molar excess of hydrogen is subjected to a solid bed of particles of catalyst comprising copper distributed in a zinc oxide matrix as a hydrogenation catalyst at an elevated pressure and temperature within a range from about 90° to 150°C., at a space velocity of about 0.2 to about 10 weight of acetophenone per weight of catalyst per hour, the improvement which consists of employing a catalyst in which the copper to zinc atom unit ratio in the catalyst particles is within the range from 2 to 8, and preparing the liquid stream to be a solution containing between about 20 percent and about 80 percent of a mononuclear aromatic hydrocarbon selected from the group consisting of benzene, ethyl benzene and toluene, and between about 80 percent and 20 percent feedstock consisting essentially of a plant grade of acetophenone and directing said solution of acetophenone feedstock in mononuclear aromatic hydrocarbon solvent through the catalyst bed at hydrogenation conditions to achieve a better combination of yield, conversion and selectivity for phenyl methyl carbinol than in the absence of said mononuclear aromatic hydrocarbon solvent.

2. The method of claim 1 in which the concentration of mononuclear aromatic hydrocarbon solvent is within a range from 51 percent to 80 percent of the liquid stream fed to the reactor inlet.

3. The method of claim 2 in which the solvent is ethyl benzene.

* * * * *